United States Patent
Ferreira et al.

(10) Patent No.: US 12,032,476 B2
(45) Date of Patent: *Jul. 9, 2024

(54) DATA UNIT TEST-BASED DATA MANAGEMENT SYSTEM

(71) Applicant: Palantir Technologies Inc., Denver, CO (US)

(72) Inventors: Francisco Ferreira, London (GB); Edgar Gomes de Araujo, Almere (NL); Jose Angel Riarola, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,639

(22) Filed: Feb. 25, 2022

(65) Prior Publication Data
US 2022/0179779 A1   Jun. 9, 2022

Related U.S. Application Data

(63) Continuation of application No. 16/693,063, filed on Nov. 22, 2019, now Pat. No. 11,294,801, which is a
(Continued)

(51) Int. Cl.
G06F 11/36   (2006.01)
G06F 8/30    (2018.01)
G06F 8/41    (2018.01)

(52) U.S. Cl.
CPC ............ *G06F 11/3688* (2013.01); *G06F 8/30* (2013.01); *G06F 8/436* (2013.01); *G06F 11/3696* (2013.01)

(58) Field of Classification Search
CPC .... G06F 11/3688; G06F 11/3936; G06F 8/30; G06F 8/436
(Continued)

(56) References Cited

U.S. PATENT DOCUMENTS 5,915,252 A * 6/1999 Misheski ............... G06F 9/449
                                                  719/330
6,006,028 A   12/1999 Aharon et al.
(Continued)

FOREIGN PATENT DOCUMENTS

AU    2014203669    5/2016
DE   102014213036   1/2015
(Continued)

OTHER PUBLICATIONS

Ding et al., "Validating a Deep Learning Framework by Metamorphic Testing", IEEE, pp. 28-34 (Year: 2017).*
(Continued)

*Primary Examiner* — Anil Khatri
(74) *Attorney, Agent, or Firm* — Knobbe, Martens, Olson & Bear, LLP

(57) ABSTRACT

An improved unit test framework that validates large datasets generated by a data management system is described herein. Typical unit test frameworks validate functions. However, the improved unit test framework validates the underlying data. For example, after each step of a data transformation process implemented by the data management system, the data management system can execute a data unit test that loads data sets into memory, checks a set of preconditions, and applies unit test logic to the loaded data sets. In some embodiments, the data management system executes the data unit tests asynchronously with the data transformation processes and therefore do not interfere with the data transformation processes. Rather, the data management system generates and transmits a notification when any step of the data transformation process fails a particular data unit test.

13 Claims, 6 Drawing Sheets

Related U.S. Application Data continuation of application No. 15/996,265, filed on Jun. 1, 2018, now Pat. No. 10,496,529.

(60) Provisional application No. 62/659,598, filed on Apr. 18, 2018.

(58) Field of Classification Search
USPC ................................................ 717/124–141
See application file for complete search history.

(56) References Cited

U.S. PATENT DOCUMENTS

| | | | |
|---|---|---|---|
| 6,057,757 A * | 5/2000 | Arrowsmith | H04L 41/0895 714/39 |
| 6,351,439 B1 | 2/2002 | Miwa et al. | |
| 6,377,907 B1 | 4/2002 | Waclawski | |
| 6,442,714 B1 * | 8/2002 | Griffin | G06F 11/2294 434/350 |
| 6,502,102 B1 * | 12/2002 | Haswell | G06F 11/3664 707/999.102 |
| 6,643,613 B2 | 11/2003 | McGee et al. | |
| 6,701,514 B1 * | 3/2004 | Haswell | G06F 11/3664 717/124 |
| 6,826,575 B1 | 11/2004 | Waclawski | |
| 6,876,314 B1 | 4/2005 | Lin | |
| 6,951,013 B1 | 9/2005 | Lozins | |
| 7,028,223 B1 | 4/2006 | Kolawa et al. | |
| 7,089,534 B2 | 8/2006 | Hartman et al. | |
| 7,117,430 B2 | 10/2006 | Maguire et al. | |
| 7,130,885 B2 | 10/2006 | Chandra et al. | |
| 7,457,431 B2 | 11/2008 | Shi et al. | |
| 7,490,108 B2 * | 2/2009 | Bruun | G06F 16/254 707/999.005 |
| 7,490,319 B2 | 2/2009 | Blackwell et al. | |
| 7,555,493 B2 | 6/2009 | Khayter et al. | |
| 7,581,212 B2 | 8/2009 | West et al. | |
| 7,644,398 B2 | 1/2010 | Cleaveland et al. | |
| 7,681,731 B1 | 3/2010 | Chern | |
| 7,739,246 B2 * | 6/2010 | Mooney | G06F 16/273 707/758 |
| 7,877,421 B2 | 1/2011 | Berger et al. | |
| 7,900,201 B1 | 3/2011 | Qureshi et al. | |
| 7,996,816 B2 | 8/2011 | Francis et al. | |
| 8,266,592 B2 | 9/2012 | Beto et al. | |
| 8,296,732 B2 | 10/2012 | Fraley et al. | |
| 8,448,155 B2 * | 5/2013 | Bordelon | G06F 8/4452 717/109 |
| 8,468,500 B2 | 6/2013 | Hatabu | |
| 8,489,474 B2 | 7/2013 | Crook et al. | |
| 8,589,736 B2 * | 11/2013 | Pasupuleti | G06F 11/3684 717/126 |
| 8,601,326 B1 | 12/2013 | Kirn | |
| 8,799,867 B1 | 8/2014 | Peri-Glass et al. | |
| 8,826,240 B1 | 9/2014 | Lachwani et al. | |
| 8,874,598 B2 | 10/2014 | Spengler et al. | |
| 8,881,105 B2 | 11/2014 | Quilter, Jr. | |
| 8,924,389 B2 | 12/2014 | Elliot et al. | |
| 8,938,434 B2 | 1/2015 | Jain et al. | |
| 8,949,996 B2 * | 2/2015 | Kalman | G06F 21/577 717/124 |
| 8,978,011 B2 * | 3/2015 | Gao | G06F 11/3688 717/124 |
| 8,984,490 B1 | 3/2015 | Dahan | |
| 9,043,759 B1 | 5/2015 | Lininger | |
| 9,104,815 B1 | 8/2015 | Cohen et al. | |
| 9,230,060 B2 | 1/2016 | Friedlander et al. | |
| 9,280,442 B1 | 3/2016 | Nicolo | |
| 9,338,013 B2 | 5/2016 | Castellucci et al. | |
| 9,348,851 B2 | 5/2016 | Kirn | |
| 9,639,456 B2 * | 5/2017 | Kortti | G06F 11/3692 |
| 9,703,849 B2 * | 7/2017 | Greenwood | G06F 11/368 |
| 9,891,808 B2 * | 2/2018 | Wilson | G06F 3/04842 |
| 10,372,807 B1 | 8/2019 | Greenbaum et al. | |
| 10,496,529 B1 | 12/2019 | Ferreira et al. | |
| 10,713,589 B1 * | 7/2020 | Zarandioon | G06N 20/00 |
| 10,832,299 B1 * | 11/2020 | Clauss | G06Q 30/0611 |
| 10,860,530 B2 | 12/2020 | Raghavan et al. | |
| 11,294,801 B2 | 4/2022 | Ferreira et al. | |
| 2002/0194058 A1 | 12/2002 | Eldering | |
| 2003/0088438 A1 | 5/2003 | Maughan et al. | |
| 2003/0171942 A1 | 9/2003 | Gaito | |
| 2004/0117387 A1 | 6/2004 | Civetta et al. | |
| 2004/0153837 A1 | 8/2004 | Preston et al. | |
| 2005/0102328 A1 | 5/2005 | Ring et al. | |
| 2006/0129992 A1 | 6/2006 | Oberholtzer et al. | |
| 2006/0161558 A1 | 7/2006 | Tamma et al. | |
| 2006/0209085 A1 | 9/2006 | Wong et al. | |
| 2008/0104407 A1 | 5/2008 | Horne et al. | |
| 2009/0199047 A1 | 8/2009 | Vaitheeswaran et al. | |
| 2009/0282097 A1 | 11/2009 | Alberti et al. | |
| 2010/0125470 A1 | 5/2010 | Chisholm | |
| 2010/0211550 A1 | 8/2010 | Daniello et al. | |
| 2010/0228786 A1 | 9/2010 | Torok | |
| 2011/0131547 A1 | 6/2011 | Elaasar | |
| 2012/0079175 A1 * | 3/2012 | Flynn | G06F 3/061 711/170 |
| 2012/0290879 A1 | 11/2012 | Shibuya et al. | |
| 2013/0006947 A1 | 1/2013 | Akinyemi et al. | |
| 2013/0024731 A1 | 1/2013 | Shochat et al. | |
| 2013/0091084 A1 | 4/2013 | Lee | |
| 2013/0097130 A1 | 4/2013 | Bingol et al. | |
| 2013/0198565 A1 | 8/2013 | Mancoridis et al. | |
| 2013/0226879 A1 | 8/2013 | Talukder et al. | |
| 2013/0246316 A1 | 9/2013 | Zhao et al. | |
| 2014/0156617 A1 | 6/2014 | Tomkins | |
| 2015/0012509 A1 | 1/2015 | Kirn | |
| 2015/0112641 A1 | 4/2015 | Faraj | |
| 2015/0188715 A1 | 7/2015 | Castelluci et al. | |
| 2015/0309920 A1 | 10/2015 | Ishigooka et al. | |

FOREIGN PATENT DOCUMENTS

| | | |
|---|---|---|
| EP | 1566758 | 8/2005 |
| EP | 1962222 | 8/2008 |
| EP | 2551799 | 1/2013 |
| EP | 2897051 | 7/2015 |
| GB | 2517582 | 2/2015 |
| NL | 2013134 | 1/2015 |
| WO | WO 2005/010685 | 2/2005 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

Li et al., "A Scalable Big Data Test Framework", IEEE, pp. 1-2 (Year: 2015).*
Baudry et al., " Barriers to Systematic Model Transformation", ACM, pp. 139-143 (Year: 2010).*
Ordonez-Ante et al., "Dynamic Data Transformation for Low Latency Querying in Big Data Systems", IEEE, pp. 2480-2489 (Year: 2017).*
Mehmood'f et al., "Automating Test Data Generation for Testing Context-Aware Applications", IEEE, pp. 104-108 (Year: 2018).*
McMinn et al., "Empirical Evaluation of a Nesting Testability Transformation for Evolutionary Testing", ACM, pp. 1-27 (Year: 2009).*
U.S. Appl. No. 10/496,529, Data Unit Test-Based Data Management System, filed Dec. 3, 2019.
U.S. Appl. No. 11/294,801, Data Unit Test-Based Data Management System, filed Apr. 5, 2022.
Felbinger et al., "Adapting Unit Tests by Generating Combinatorial Test Data", IEEE, 2018, pp. 352-355.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, p. 14, accessed Oct. 3, 2013.
Golden et al., "Digital Filter Synthesis by Sampled-Data Transformation", IEEE, 1968, pp. 321-329.

(56) References Cited

OTHER PUBLICATIONS

Guo et al., "Proactive Wrangling: MixedInitiative End User Programming of Data Transformation Scripts", ACM, 2011, pp. 65-74.
Haclgumus et al., "Executing SOL over Encrypted Data in the Database-Service-Provider Model", ACM, 2002, pp. 216-227.
Johnson, Steve, "Access 2013 on demand," Access 2013 on Demand, May 9, 2013, Que Publishing, 22 pages.
Kandel et al., "Wrangler: Interactive Visual Specification of Data Transformation Scripts", ACM, 2011, pp. 3363-3372.
Kusiak et al., "Feature Transformation Methods in Data Mining", IEEE, 2001, pp. 214-221.
Leitner et al., "Efficient Unit Test Case Minimization", ACM, 2007, pp. 417-420.
Masud et al., "From Data to Knowledge", IEEE, 2010, pp. 445-449.
McBrien et al., "Data Integration by B-Directional Schema Transformation Rules", IEEE, 2003, pp. 227-238.
Pythagoras Communications Ltd., "Microsoft CRM Duplicate Detection," Sep. 13, 2011, https://www.youtube.com/watch?v=j-7QisODOKc, 1 page.
Schimmel et al., "Combining Unit Tests for Data Race Detection", IEEE, 2015, pp. 43-47.
Stratis et al., "Assessing the Effect of Data Transformations on Test Suite Compilation", 2018, ACM, pp. 1-10.
Sung et al., "DL: A Data Layout Transformation System for Heterogeneous Computing", IEEE, 2012, pp. 1-11.
Yadav et al., "Analysis of k-fold cross-validation over hold-out validation on colossal datasets for quality classification", IEEE, 2016, pp. 78-83.
Zhu et al., "Software Unit Test Coverage and Adequacy", ACM, 1997, pp. 366-427.

\* cited by examiner

```
public void dataUnitTest() {
    given(as("variable_1", column("col_1").dataset("folder_1/folder_2/sampleData")))     // 410
        .andGiven(as("variable_2", column("col_2").dataset("folder_1/folder_3/sampleData2")))   // 412
        .when("variable_1", isNotNull())          // 414
        .and("variable_2", isNotNull())           // 416
        .expect("variable_1", toIntersect(withThreshold(0.65)), "variable_2")   // 418
        .expect("variable_2", toOnlyContainUniques())    // 420
        .verify();
}
```

FIG. 4

DATA UNIT TEST-BASED DATA MANAGEMENT SYSTEM

CROSS-REFERENCE TO RELATED APPLICATIONS

This application is a continuation of U.S. patent application Ser. No. 16/693,063, entitled "DATA UNIT TEST-BASED DATA MANAGEMENT SYSTEM" and filed on Nov. 22, 2019, which is a continuation of U.S. patent application Ser. No. 15/996,265, entitled "DATA UNIT TEST-BASED DATA MANAGEMENT SYSTEM" and filed on Jun. 1, 2018, which claims priority under 35 U.S.C. § 119(e) to U.S. Provisional Application No. 62/659,598, entitled "DATA UNIT TEST-BASED DATA MANAGEMENT SYSTEM" and filed on Apr. 18, 2018, which are hereby incorporated by reference herein in their entireties.

TECHNICAL FIELD

The present disclosure relates to systems and techniques for validating data using a unit test framework. More specifically, the present disclosure relates to systems and techniques for validating data using a unit test framework asynchronously within a data processing pipeline.

BACKGROUND

A data management system includes software to transform and generate large data sets in a series of steps. Moreover, the transformation software can be programmed by multiple programmers and used by many downstream users of the generated data. However, as part of a software development life cycle, the transformation software can change over time, which might inadvertently cause issues in the generated data sets.

SUMMARY

The systems, methods, and devices described herein each have several aspects, no single one of which is solely responsible for its desirable attributes. Without limiting the scope of this disclosure, several non-limiting features will now be discussed briefly.

Described herein is an improved unit test framework that validates large datasets generated by a data management system. As mentioned above, existing unit test frameworks validate functions. However, the improved unit test framework described herein validates the underlying data. For example, after each step of a data transformation process implemented by the data management system, the data management system can execute a data unit test that loads data sets into memory, checks a set of preconditions, and applies unit test logic to the loaded data sets. As an illustrative example, the syntax of the instructions executed by the data unit test can follow the "given, when, then" format. In some embodiments, the data management system executes the data unit tests asynchronously with the data transformation processes and therefore do not interfere with the data transformation processes. Rather, the data management system generates and transmits a notification when any step of the data transformation process fails a particular data unit test.

Various embodiments of the present disclosure provide improvements to various technologies and technological fields. For example, existing unit test frameworks are limited in various ways (e.g., limited in that such frameworks validate functions, not underlying data), and various embodiments of the disclosure provide significant improvements over such technology. Additionally, various embodiments of the present disclosure are inextricably tied to computer technology. In particular, various embodiments rely on loading data sets into memory, filtering data sets according to a set of preconditions, applying one or more conditions to the filtered data, and optionally stopping a separate data transformation process based on result of the application of the condition(s). Such features and others (e.g., generating notifications in response to a failure to validate a data set, validating an entire data set using condition(s) applied to a subset of data values and/or using condition(s) that are true for a subset of data values, etc.) are intimately tied to, and enabled by, computer technology, and would not exist except for computer technology. For example, the data unit test operations described below in reference to various embodiments cannot reasonably be performed by humans alone, without the computer technology upon which they are implemented. Further, the implementation of the various embodiments of the present disclosure via computer technology enables many of the advantages described herein, including more efficient and/or faster interaction with, generation of, transmission of, and presentation of, various types of electronic data.

One aspect of the disclosure provides a method for a data unit test framework. The method comprises: applying first data unit test instructions to a first data set generated as a first step in a data transformation process, where applying first data unit test instructions further comprises: defining, according to the first data unit test instructions, a first variable for one or more elements of the first data set; evaluating, according to the first data unit test instructions, that a precondition of a first value for the first variable is satisfied; and determining, according to the first data unit test instructions, that the first value fails a first condition in relation to an expected value for the first variable. The method further comprises, in response to determining that the first value fails the first condition, transmitting a first notification indicating that the first data set failed a first data unit test; and applying second data unit test instructions to a second data set generated as a second step in the data transformation process, where applying second data unit test instructions further comprises: defining, according to the second data unit test instructions, a second variable for one or more elements of the second data set, and determining, according to the second data unit test instructions, that a plurality of second values for the second variable fails a second condition in relation to an expected threshold for the plurality of second values. The method further comprises, in response to determining that the plurality of second values for the second variable fails the second condition, transmitting a second notification indicating that the second data set failed a second data unit test, where the method is performed by one or more computer hardware processors.

The method of the preceding paragraph can include any sub-combination of the following features: where the method further comprises, in response to determining that the plurality of the second values for the second variable fails the second condition, instructing the data transformation process to terminate; where determining that the plurality of the second values for the second variable fails the second condition does not result in a termination of the data transformation process; where defining a first variable for one or more elements of the first data set further comprises defining the first variable as corresponding to a first column in the first data set; where the method further comprises defining, according to the first data unit test instructions, a third variable as corresponding to a second column in the first data set, determining, according to the first data unit test instructions, that a third value of the third variable satisfies a second precondition, and determining, according to the first data unit test instructions, that the first data set is invalid in response to a determination that the first condition fails and that a comparison of the first value and the third value fails a third condition; where applying first data unit test instructions to a first data set further comprises: converting the first data unit test instructions into a matcher, and executing the matcher on the first value of the first data set; and where the method further comprises applying the first data unit test instructions to a third data set generated as a third step in the data transformation process.

Another aspect of the disclosure provides a system comprising: at least one processor; and a storage device configured to store computer-executable instructions, the computer-executable instructions, when executed by the at least one processor, cause the system to at least: define a first variable for one or more elements of a first data set generated as a first step in a data transformation process, wherein the first variable corresponds to a plurality of data values of the first data set, filter the plurality of data values based on a first precondition to obtain a subset of the plurality of data values, determine that a threshold percentage of the subset of the plurality of data values satisfy a first condition, define a second variable for one or more elements of a second data set generated as a second step in the data transformation process, wherein the second variable corresponds to a second value of the second data set, determine that the second value does not satisfy a second condition, and in response to the determination that the second value does not satisfy the second condition, generate and transmit a first notification indicating that the second data set failed a second data unit test.

The system of the preceding paragraph can include any sub-combination of the following features: where the system further comprises a first data processor configured with second computer-executable instructions that, when executed, cause the first data processor to generate the first data set, wherein the first data processor performs the first step in the data transformation process, a second data processor configured with third computer-executable instructions that, when executed, cause the second data processor to generate the second data set, wherein the second data processor performs the second step in the data transformation process, and a third data processor, wherein the third data processor performs a third step in the data transformation process; where the computer-executable instructions, when executed by the at least one processor, further cause the system to at least, in response to the determination that the second value does not satisfy the second condition, instruct the third data processor not to generate a third data set in the third step; where the third data processor is configured with fourth computer-executable instructions that, when executed, cause the third data processor to generate the third data set after the determination that the second value does not satisfy the second condition; where the computer-executable instructions, when executed by the at least one processor, further cause the system to at least define the first variable as corresponding to a first column in the first data set; where the computer-executable instructions, when executed by the at least one processor, further cause the system to at least: define a third variable that corresponds to a second column in the first data set, wherein the second column is associated with a second plurality of data values, filter the second plurality of data values based on a second precondition to obtain a third value, and determine that the first data set is invalid in response to a determination that a comparison of the subset of the plurality of data values and the third value fails a third condition; where the first condition is a matcher; and where the computer-executable instructions, when executed by the at least one processor, further cause the system to at least determine a validity of the first data set and a third data set using a same data unit test.

Another aspect of the disclosure provides one or more non-transitory, computer-readable storage media storing computer-executable instructions, which if performed by one or more processors, cause the one or more processors to at least: define a first variable for one or more elements of a first data set generated as a first step in a data transformation process, wherein the first variable corresponds to a plurality of data values of the first data set; filter the plurality of data values based on a first precondition to obtain a subset of the plurality of data values; determine that a threshold percentage of the subset of the plurality of data values satisfy a first condition; define a second variable for one or more elements of a second data set generated as a second step in the data transformation process, wherein the second variable corresponds to a second value of the second data set; determine that the second value does not satisfy a second condition; and generate and transmit a first notification indicating that the second data set failed a second data unit test.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 illustrates a user interface displaying example given, when, and then instructions in a window.

DETAILED DESCRIPTION

Overview

Figure 1:
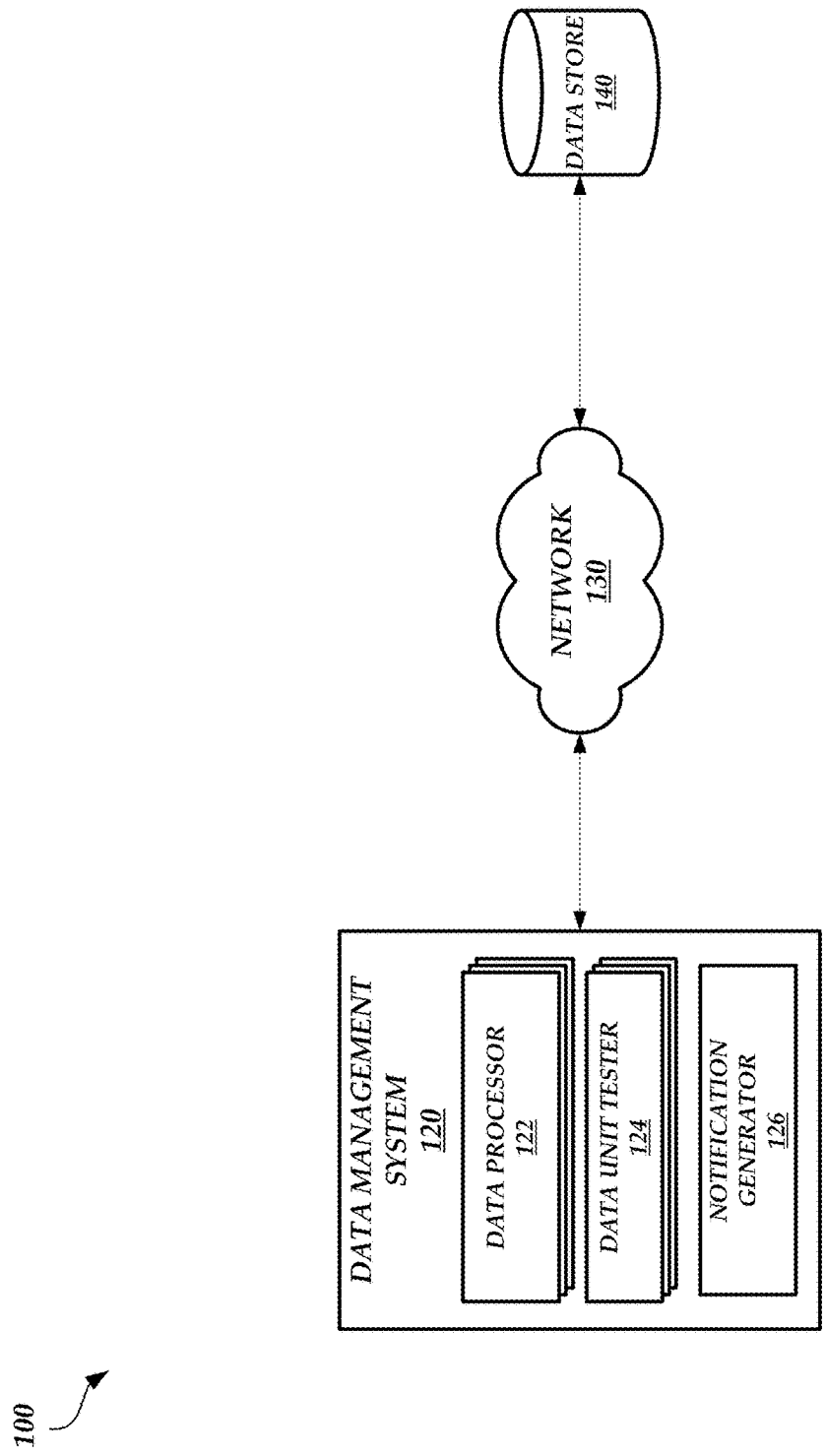
FIG. 1 illustrates a block diagram showing an example of various components of an operating environment in which a data management system executes various data unit testers, in accordance with some embodiments.

As described above, a data management system includes software to transform and generate large data sets in a series of steps. Moreover, the transformation software can be programmed by multiple programmers and used by many downstream users of the generated data. However, as part of a software development life cycle, the transformation software can change over time, which might inadvertently cause issues in the generated data sets.

Existing unit test frameworks validate functions, but typically do not validate data. It may be desirable to validate the underlying generated data because a successful validation may indicate that the changed transformation software has not inadvertently broken data integrity and/or other downstream systems. It may also be desirable that the validation process not interrupt the data transformation and generation processes so as not to introduce additional latency in the data transformation and generation processes. To aid in usability and understandability by data administrators that may not have a high level of expertise, it may be desirable that the validation process syntax be in a format that is customizable and simple to understand. Finally, it may be desirable that the validation process be able to test individual data values in the data sets and thresholds of values from the data sets.

Accordingly, an improved unit test framework that validates large datasets generated by a data management system is described herein. As mentioned above, existing unit test frameworks validate functions. However, the improved unit test framework described herein validates the underlying data. For example, after each step of a data transformation process implemented by the data management system, the data management system can execute a data unit test that loads data sets into memory, checks a set of preconditions, and applies unit test logic to the loaded data sets. As an illustrative example, the syntax of the instructions executed by the data unit test can follow the "given, when, then" format. In some embodiments, the data management system executes the data unit tests asynchronously with the data transformation processes and therefore do not interfere with the data transformation processes. Rather, the data management system generates and transmits a notification when any step of the data transformation process fails a particular data unit test.

None, some, or all of the data unit tests can include one or more instructions that indicate that a loaded data set satisfies a test condition, and therefore is valid, if at least a certain threshold of the data values in the loaded data set satisfy the test condition. If any data unit test determines that a loaded data set is not valid, the data management system either (1) can stop the execution of current and/or future data transformation processes and provide the generated notification or (2) can allow the data transformation processes to continue until the current data transformation process or all data transformation processes are completed and provide the generated notification immediately upon generation or upon completion of the data transformation process(es).

While the present disclosure describes the improved unit test framework (e.g., the data unit test framework) in the context of a data management system that transforms and generates data sets in a series of steps, this is not meant to be limiting. The improved unit test framework can be implemented independent of any data management system that processes and generates data and can be used in conjunction with a data management system that processes data in any number of steps (e.g., 1, 2, 3, 4, etc.). For example, a computing device separate from a system that generates data can execute a data unit test on data obtained from an external source. The computing device can then transmit notifications and/or instructions to other devices, such as a data management system, such that these other devices can take appropriate actions (e.g., stop further data processing, modify the instructions used to generate data, etc.).

Example Data Unit Test Environment

FIG. 1 illustrates a block diagram showing an example of various components of an operating environment 100 in which a data management system 120 executes various data unit testers 124, in accordance with some embodiments. As illustrated in FIG. 1, the operating environment 100 includes the data management system 120 and a data store 140 that communicate with each other via a network 130.

The data management system 120 is one or more physical computing devices that are configured to execute one or more data processors 122, one or more data unit testers 124, a notification generator 126, and/or other applications (not shown). The data management system 120 may include hardware components, such as a processor, a networking interface, memory, a cache, etc. Such components are described in greater detail below with respect to FIG. 6.

As described herein, the data management system 120 may execute data transformation processes in a series of steps. Each step or data transformation process may be implemented by a data processor 122. For example, a data processor 122, when executed, may perform a data transformation by obtaining a data set, processing the data set, and generating a result based on the processing. The generated result may be a modified version of the obtained data set, a data set formed using the obtained data set, and/or the like. The result generated by one data processor 122 may be used as an input by a second data processor 122. The result generated by the second data processor 122 may be used as an input by a third data processor 122, and so on. The data processors 122 can operate in sequence (as described in the above example) and/or in parallel.

The data processors 122 may be programmed by multiple programmers and outputs of the data processors 122 may be used by one or more users downstream from the data management system 120 (e.g., one or more users operating computing devices, not shown). For example, downstream computing devices may access the outputs of one or more data processors 122 via the network 130. Because the data processors 122 may be periodically updated by a programmer, it may be important to verify that data sets previously generated by one or more of the data processors 122 are still readable, accurate, compatible with downstream computing devices, and/or otherwise valid.

Typical unit test frameworks validate functions, not the underlying data. In particular, typical unit test frameworks execute a function and compare an output of the function to an expected output. If the actual output matches the expected output, then the function is validated. However, validating that a function produces a desired result does not ensure that data sets were transformed correctly and downstream computing devices can still use the outputs produced by the data processors 122.

Thus, the data unit testers 124 can validate the underlying data sets generated by the various data processors 122. For example, a data unit tester 124 can obtain a data set generated by a data processor 122 from the data processor 122 itself and/or from the data store 140 (e.g., after the data processor 122 stores the data set in the data store 140). The data unit tester 124 can load the obtained data set into memory (e.g., memory of the data unit tester 124, memory of the data management system 120, etc.), check one or more preconditions and/or filter the loaded data set based on the precondition(s), and apply unit test logic of the data unit tester 124 to the loaded data sets.

As an example, the data unit tester 124 may execute a set of user-defined instructions. The instructions may be separated into "given" instructions, "when" instructions, and "then" instructions. The data unit tester 124 may include any number of given instructions (e.g., 0, 1, 2, 3, 4, 5, etc.), any number of when instructions (e.g., 0, 1, 2, 3, 4, 5, etc.), and/or any number of then instructions (e.g., 0, 1, 2, 3, 4, 5, etc.). A given instruction may indicate a data set to load into memory, may indicate a location of the data set, and/or may define a variable corresponding to at least a portion of the values of the loaded data set. As an illustrative example, a given instruction can be in the following format: .given(as ("variable_1", column("col_1").dataset("dataset_1"))), where the loaded data set is "dataset_1" and a variable "variable_1" is defined as including the data values found in "col_1" of "dataset_1".

A "when" instruction may define a precondition that, when applied, results in data values corresponding to the defined variable that do not satisfy the precondition being discarded or filtered. Thus, after application of a when instruction, a subset of the data values that originally corresponded to the defined variable may remain corresponding to the defined variable. As an illustrative example, a when instruction can be in the following format: .when("variable_1", isNotNull( )), where data values corresponding to "variable_1" that are null are filtered and no longer correspond to "variable_1".

A "then" instruction may define unit test logic. For example, unit test logic may identify a defined variable (e.g., a defined variable in which a subset of the data values originally corresponding to the variable have been filtered using a when instruction) and a condition that data values that remain corresponding to the defined variable are expected to satisfy. The condition included in the unit test logic may also be referred to herein as a "matcher." Generally, the matcher may be a function that returns a true value if an expected result defined by the matcher (and any matcher arguments and/or any parameters included in the then instruction) is achieved or a false value if an expected result defined by the matcher (and any matcher arguments and/or any parameters included in the then instruction) is not achieved. If the matcher fails or returns a false value (e.g., the data values that remain corresponding to the defined variable do not satisfy the identified condition), then the data unit tester 124 determines that the loaded data set is no longer valid. On the other hand, if the matcher passes, succeeds, or returns a true value (e.g., the data values that remain corresponding to the defined variable satisfy the identified condition), then the data unit tester 124 determines that the loaded data set is valid. As an illustrative example, a then instruction can be in the following format: .expect ("variable_1", toOnlyContainUniques( )), where the condition is that the data values that remain corresponding to "variable_1" must be unique and thus the matcher fails if any set of data values that remain corresponding to "variable_1" are duplicates. A more detailed example of the given, when, and then instructions are described below with respect to FIG. 4.

To execute the given, when, and/or then instructions, the data unit tester 124 may parse the instructions to identify specific data then enables the proper execution of the instructions. For example, the data unit tester 124 can parse a given instruction to identify a specified location of a data set and use the identified location to load the data set. The data unit tester 124 can also parse a when instruction to identify a precondition, and then use the precondition to filter data values corresponding to a defined variable. The data unit tester 124 can also parse a then instruction to identify a condition and use the condition to convert the then instruction into a matcher that, when executed, causes the data unit tester 124 to determine whether a comparison or condition defined by the matcher is true or false (e.g., whether data values specified by the then instruction are unique, whether data values specified by the then instruction are greater than a certain value, whether first data values specified by the then instruction intersect or partially intersect with second data values specified by the then instruction, etc.).

If the matcher returns a false value, the data unit tester 124 may throw an exception, which is received by the notification generator 126. The exception may identify which matcher returned a false value (and thus which comparison or condition failed), the loaded data set(s) that caused the matcher to return a false value (and thus which loaded data set is determined to be invalid), which data processor 122 generated the data set that is determined to be invalid, and/or the like. The notification generator 126 can use the exception to generate a notification that includes some or all of the information included in the exception, and transmit the notification to a user computing device (not shown) as a text message, an electronic mail (e.g., accessible by the user computing device via an electronic mail server), a push notification that causes the user computing device to automatically open an application and display the notification, etc. Alternatively or in addition, the notification generator 126 can generate user interface data that, when rendered by a user computing device, causes the user computing device to display a user interface that identifies one or more data processors 122, identifies a data processor 122 (or data processors 122) that generated an invalid data set, and/or any other data that may be included in the exception. For example, the user interface may display text identifying the data processor(s) 122 that generated an invalid data set, a visual topology of data processors(s) 122 (e.g., arranged to show the flow of data from one data processor 122 to the next data processor 122) with a mark (e.g., a red mark) or a symbol denoting the data processor(s) 122 that generated an invalid data set, etc. The notification generator 126 can then transmit the user interface data to the user computing device.

In some embodiments, the unit test logic (e.g., a then instruction)—and specifically the condition—further identifies a threshold value (e.g., a numerical quantity, a percentage, etc.). If the unit test logic identifies a threshold value, then the data unit tester 124 determines that the loaded data set is valid if at least a number of data values corresponding to the threshold value and that remain corresponding to the defined variable satisfy the identified condition. As an illustrative example, 10 data values may remain corresponding to a first variable after a when instruction is executed. The first variable may represent a geographic location and thus the 10 data values may be geographic coordinates. A then instruction may identify the first variable and a first condition that is satisfied if 60% (e.g., the threshold value) of the 10 data values that remain corresponding to the first variable are east of a specific geographic location (e.g., the city of London). Thus, the data unit tester 124 determines that the entire loaded data set is valid if at least 6 of the data values that remain corresponding to the first variable are east of the specific geographic location. Accordingly, the data unit tester 124 can validate (or invalidate) an entire loaded data set without analyzing each individual data value that forms the data set. By determining the validity of an entire loaded data set using a subset of the data values of the data set, the data unit tester 124 can reduce the processing load and/or memory usage of the data management system 120 and/or can reduce the latency associated with validating data sets generated by the data processors 122 (or other devices or systems, not shown).

To avoid interfering with the operations performed by the data processors 122 (and thereby to avoid increasing the latency of the data transformation process due to the data unit tester(s) 124 validating data sets), the data unit testers 124 can operate asynchronously from the data processors 122. For example, the data management system 120 can continue to execute the data processors 122 in sequence and/or in parallel. Separate from the data processors 122 data flow, the data management system 120 can execute the data unit testers 124. As an illustrative example, the data management system 120 can execute a data unit tester 124 before, during, and/or after executing a data processor 122. The data processors 122 can continue to execute while the data unit testers 124 are executing, and the data processors 122 may cease executing if, for example, a data unit tester 124 is configured to stop the data processing if a loaded data set is determined to be invalid, as described above.

In some embodiments, a data unit tester 124 validates data values in data sets that have one or more columns. For example, the given, when, and then instructions of the data unit tester 124 may be directed to validating a loaded data set (or multiple loaded data sets) in a single session (e.g., where a session may include one execution of each instruction of the data unit tester 124) using data values corresponding to a single column in the loaded data set, validating a loaded data set based on a comparison of first data values corresponding to a first column in the loaded data set (or another loaded data set) with second data values corresponding to a second column in the loaded data set (or another loaded data set), validating a loaded data set based on a comparison of first data values corresponding to a first column in the loaded data set (or another loaded data set), second data values corresponding to a second column in the loaded data set (or another loaded data set), and third data values corresponding to a third column in the loaded data set (or another loaded data set), and so on. Thus, the data unit tester 124 can validate a loaded data set (or multiple loaded data sets) in a single session using data values from any number of columns from any number of different data sets.

One data unit tester 124 may correspond to a single data processor 122. For example, a first data unit tester 124 may validate data sets generated by a first data processor 122. Alternatively or in addition, one data unit tester 124 may correspond to a plurality of data processors 122 (e.g., two data processors 122, three data processors 122, four data processors 122, etc.). For example, a first data unit tester 124 may validate data sets generated by a first data processor 122, a second data processor 122, and so on. Alternatively or in addition, one data processor 122 may correspond to multiple data unit testers 124. For example, a first data unit tester 124 and a second data unit tester 124 may each be configured to validate data sets generated by a first data processor 122.

As used herein, the term "data store" is broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure. Such data structures may be configured to store computer-executable instructions that may communicate with various hardware processors to cause said processors to perform various functions.

The user and/or downstream computing devices, not shown, can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

While the data store 140 is depicted in FIG. 1 as being external to the data management system 120, this is not meant to be limiting. For example, the data store 140 can be located internal to the data management system 120.

In an embodiment, the network 130 includes any communications network, such as the Internet. The network 130 may be a wired network, a wireless network, or a combination of the two. For example, network 130 may be a local area network (LAN) and/or a wireless area network (WAN).

Figure 2:
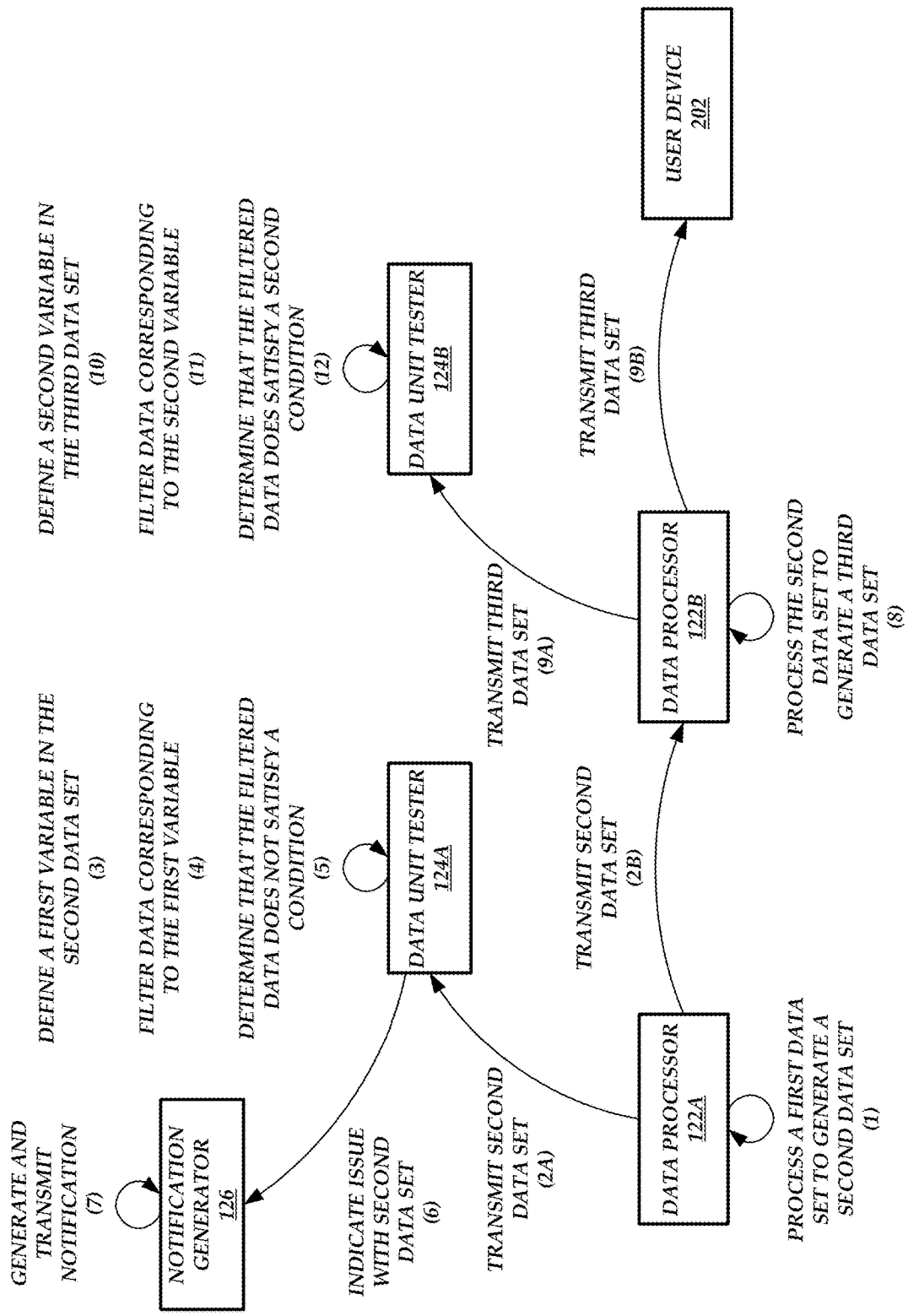
FIG. 2 is a block diagram of the operating environment of FIG. 1 illustrating the operations performed by the components of the operating environment to validate data sets using a data unit test framework, according to one embodiment.

Example Block Diagrams for Validating Data Sets Using a Data Unit Test Framework FIG. 2 is a block diagram of the operating environment 100 of FIG. 1 illustrating the operations performed by the components of the operating environment 100 to validate data sets using a data unit test framework, according to one embodiment. As illustrated in FIG. 2, data processor 122A processes a first data set to generate a second data set at (1). The data processor 122A may be the first step in a data transformation process. The data processor 122A then transmits the second data set to data unit tester 124A at (2A) and to data processor 122B at (2B).

The data unit tester 124A can operate asynchronously of the data processor 122A and/or the data processor 122B. The data unit tester 124A can define a first variable in the second data set at (3). For example, the data unit tester 124A may include a given instruction that defines the first variable. The data unit tester 124A can then filter data corresponding to the first variable at (4). For example, the data unit tester 124A may include a when instruction that, when executed, causes the data unit tester 124A to filter certain data values originally corresponding to the first variable. The data unit tester 124A can then execute one or more then instructions and determine that the filtered data does not satisfy a condition at (5). For example, the then instruction(s) may include a condition that is not satisfied by the data values that remain corresponding to the first variable. Thus, the data unit tester 124A determines that the second data set is not valid.

In response to determining that the filtered data does not satisfy the condition, the data unit tester 124A can indicate to the notification generator 126 that there is an issue with the second data set at (6). For example, the indication may be an exception thrown by the data unit tester 124A. The notification generator 126 can then generate and transmit a notification at (7) to a user computing device and/or a downstream computing device, not shown.

Before, during, and/or after the data unit tester 124A performs steps (3)-(6) and/or the notification generator 126 performs step (7), the data processor 122B can process the second data set to generate a third data set at (8). The data processor 1226 may be the second and final step in a data transformation process. The data processor 1226 can then transmit the third data set to data unit tester 1246 at (9A) and to user device 202 at (9B).

The data unit tester 1246 can operate asynchronously of the data processor 122A and/or the data processor 1226. The data unit tester 1246 can define a second variable in the third data set at (10). For example, the data unit tester 1246 may include a given instruction that defines the second variable. The data unit tester 1246 can then filter data corresponding to the second variable at (11). For example, the data unit tester 1246 may include a when instruction that, when executed, causes the data unit tester 1246 to filter certain data values originally corresponding to the second variable. The data unit tester 1246 can then execute one or more then instructions and determine that the filtered data does satisfy a second condition at (12). Unlike the data unit tester 124A, the data unit tester 1246 may not contact the notification generator 126 because the matcher passed and therefore the data unit tester 1246 determined that the third data set is valid.

While FIG. 2 depicts data processor 1226 processing the output of data processor 122A, this is merely an example and is not meant to be limiting. For example, the data processor 122A can instead store the second data set in the data store 140. The data processor 1226 can then process the second data set by retrieving the second data set from the data store 140 and/or can process another data set retrieved from the data store 140 to generate the third data set.

In addition, while FIG. 2 depicts two data processors 122A-1226 in the data transformation process, this is not meant to be limiting. Any number of data processors 122 can be present in the data transformation process. Furthermore, while FIG. 2 depicts one data unit tester 124 per data processor 122, this is not meant to be limiting. For example, data processors 122A-1226 can both transmit their resulting data set to the same data unit tester 124A or 1246.

As shown in FIG. 2, the data transformation process is not terminated even though the data unit tester 124A determined that the second data set is not valid. In other embodiments, however, the data transformation process may terminate in such a situation.

Figure 3:
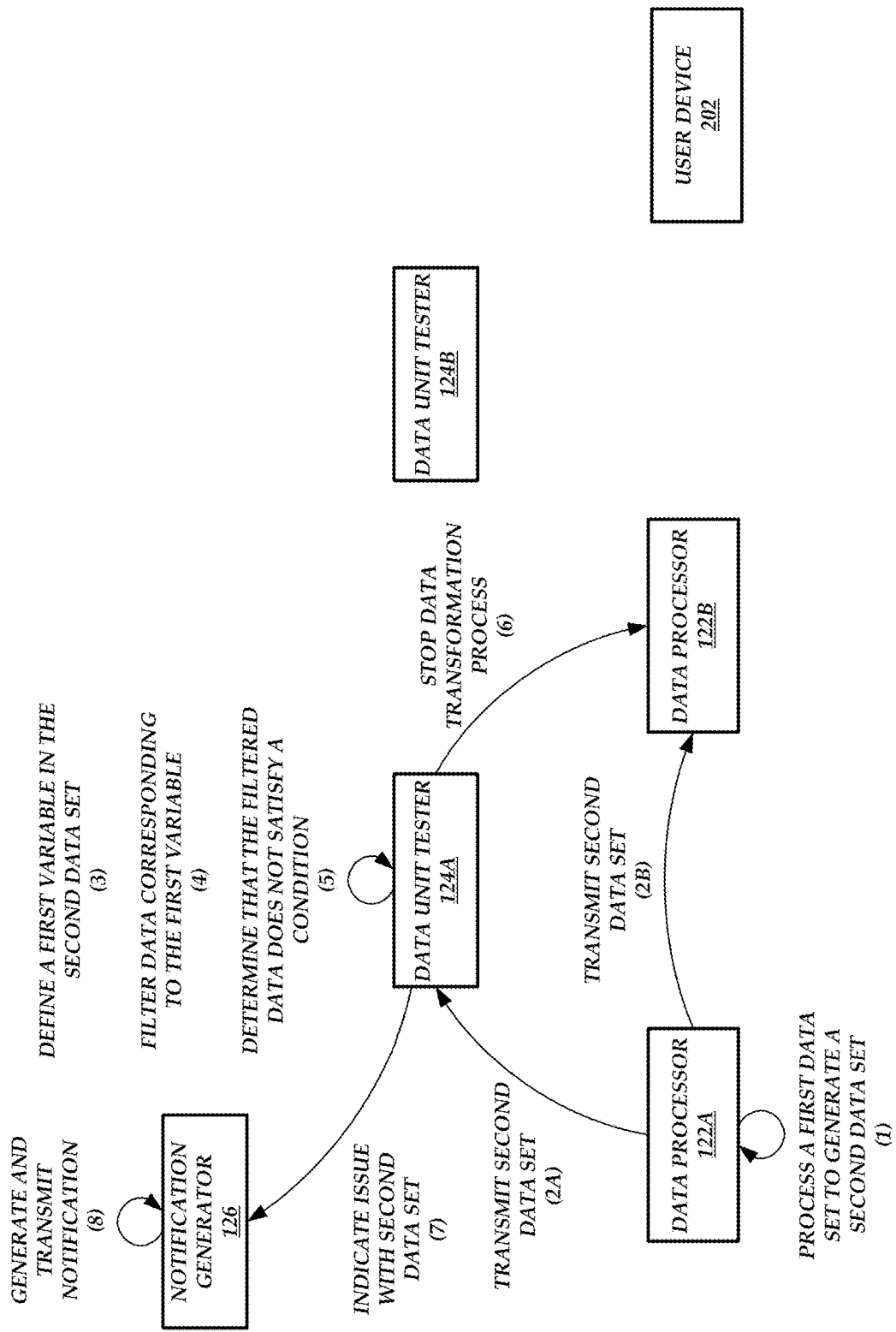
FIG. 3 is another block diagram of the operating environment of FIG. 1 illustrating the operations performed by the components of the operating environment to validate data sets using a data unit test framework, according to one embodiment.

For example, FIG. 3 is another block diagram of the operating environment 100 of FIG. 1 illustrating the operations performed by the components of the operating environment 100 to validate data sets using a data unit test framework, according to one embodiment. As illustrated in FIG. 3, data processor 122A processes a first data set to generate a second data set at (1). The data processor 122A may be the first step in a data transformation process. The data processor 122A then transmits the second data set to data unit tester 124A at (2A) and to data processor 122B at (2B).

The data unit tester 124A can operate asynchronously of the data processor 122A and/or the data processor 122B. The data unit tester 124A can define a first variable in the second data set at (3). For example, the data unit tester 124A may include a given instruction that defines the first variable. The data unit tester 124A can then filter data corresponding to the first variable at (4). For example, the data unit tester 124A may include a when instruction that, when executed, causes the data unit tester 124A to filter certain data values originally corresponding to the first variable. The data unit tester 124A can then execute one or more then instructions and determine that the filtered data does not satisfy a condition at (5). For example, the then instruction(s) may include a condition that is not satisfied by the data values that remain corresponding to the first variable. Thus, the data unit tester 124A determines that the second data set is not valid.

In response to determining that the filtered data does not satisfy the condition, the data unit tester 124A instruct the data processor 122B to stop the data transformation process at (6). Thus, unlike the embodiment depicted in FIG. 2, the data processor 122B does not process the received second data set. The data unit tester 124A can also indicate to the notification generator 126 that there is an issue with the second data set at (7). For example, the indication may be an exception thrown by the data unit tester 124A. The notification generator 126 can then generate and transmit a notification at (8) to a user computing device and/or a downstream computing device, not shown.

Example Given, when, and then Instructions

FIG. 4 illustrates a user interface 400 displaying example given, when, and then instructions in a window 405. The given, when, and then instructions displayed in the user interface 400 may correspond to the instructions that form a data unit tester 124. The user interface 400 can be displayed by a user device and/or the data management system 120 used by a user to code a data unit tester 124.

As illustrated in FIG. 4, the data unit tester 124 is defined by a dataUnitTest( ) function that includes the given, when, and then instructions. Given instruction 410 defines a variable "variable_1" as corresponding to the data values in column "col_1" of the data set located at the identified location (e.g., "folder_1/folder_2/sampleData"). Given instruction 412 defines a variable "variable_2" as corresponding to the data values in column "col_2" of the data set located at the identified location (e.g., "folder_1/folder_2/sampleData2"). Thus, the data unit tester 124 defines two variables "variable_1" and "variable_2."

When instruction 414 causes the data values corresponding to variable "variable_1" to be filtered. For example, once executed, when instruction 414 results in "variable_1" corresponding to just those data values in column "col_1" that are not null. Similarly, when instruction 416 causes the data values corresponding to variable "variable_2" to be filtered. For example, once executed, when instruction 416 results in "variable_2" corresponding to just those data values in column "col_2" that are not null.

Then instruction 418 identifies "variable_1," "variable_2," an intersect condition (e.g., the toIntersect( ) function, which is a matcher), and a threshold value 0.65. The then instruction 418, when executed, provides a true value if there is at least a 65% overlap of the data values in column "col_1" that are not null and the data values in column "col_2" that are not null (e.g., at least 65% of the data values in each column that are not null are common). Then instruction 420 identifies "variable_2" and a unique condition (e.g., the toOnlyContainUniques( ) function, which is a matcher). The then instruction 420, when executed, provides a true value if the data values in column "col_2" that are not null are all unique data values.

Generally, a condition may include zero or more arguments (e.g., the threshold value in the case of then instruction 418). The argument(s) may determine how the condition (e.g., matcher) evaluates other parameters included in the then instruction (e.g., "variable_1" in then instruction 418 and "variable_2" in then instructions 418 and 420) and uses such parameters to produce a true or false value. In the case of then instruction 418, the argument in the condition indicates that the matcher will produce a true value if other parameters included in the then instruction 418 correspond to data values that have at least an overlap identified by the argument.

If either "then" instruction 418 or 420 fails, then the data unit tester 124 determines that the data set identified by given instruction 410 and/or the data set identified by given instruction 412 are not valid. Alternatively, if either then instruction 418 or 420 passes, then the data unit tester 124 determines that the data set identified by given instruction 410 and/or the data set identified by given instruction 412 are valid. Still alternatively, if then instruction 418 passes, then the data unit tester 124 determines that the data set identified by given instruction 410 is valid (because then instruction 420 does not refer to a variable defined based on the data set identified by given instruction 410), and if both then instructions 418 and 420 pass, then the data unit tester 124 determines that the data set identified by given instruction 412 is valid (because both then instructions 418 and 420 refer to a variable defined based on the data set identified by given instruction 412).

While FIG. 4 illustrates instructions 410, 412, 414, 416, 418, and 420, these instructions are merely examples and are not meant to be limiting. Any number or type of given, when, and/or then instructions may be added to a data unit tester. For example, the then instructions can include a condition, a function within a condition that is applied before the condition is tested (e.g., a data filtering function in which a subset of data values resulting from the applied function are tested against the condition, a size function in which a size of data values is determined when the function is applied and the size is tested against the condition, etc.), and/or any other type of equation or function that can be used to test data values.

Example Process Flow

Figure 5:
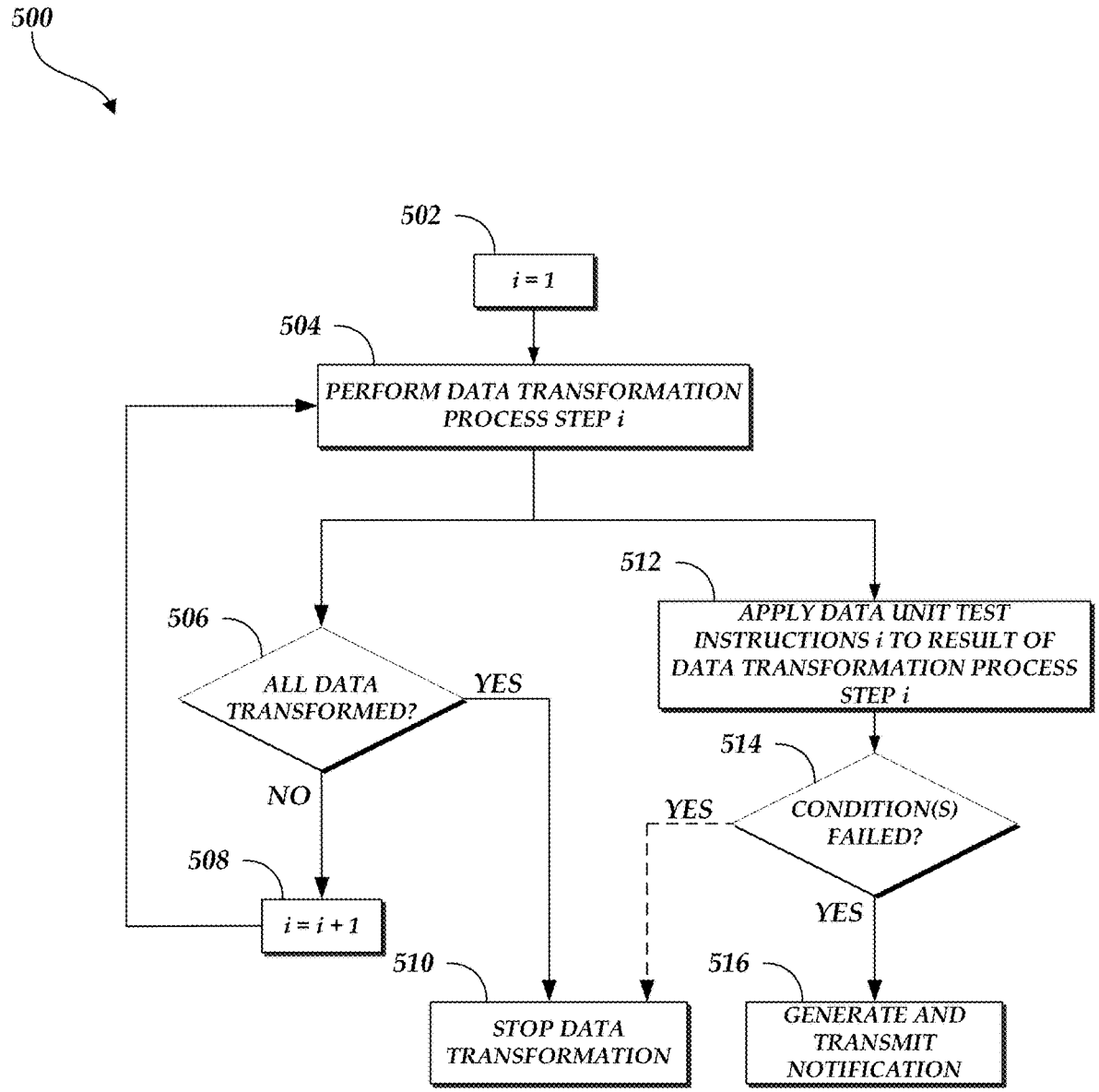
FIG. 5 is a flowchart depicting an illustrative data transformation and data unit test process, according to one embodiment.

FIG. 5 is a flowchart depicting an illustrative data transformation and data unit test process 500, according to one embodiment. The process 500 of FIG. 5 may be performed by various computing devices, such as by the data management system 120 described above. Depending on the embodiment, the process 500 of FIG. 5 may include fewer and/or additional blocks and the blocks may be performed in an order different than illustrated.

In block 502, a variable i is set equal to 1. The variable i may represent a step in a data transformation process performed by various data processors 122.

In block 504, data transformation process step i is performed. After the data transformation process step i is performed, the data transformation and data unit test process 500 proceeds to blocks 506 and 512.

In block 506, a determination is made as to whether all data has been transformed. All data may have been transformed if step i is the last step in the data transformation process. If all data has been transformed, then the data transformation and data unit test process 500 proceeds to block 510 and data transformation is stopped. Otherwise, if all data has not been transformed, then the data transformation and data unit test process 500 proceeds to block 508.

In block 508, variable i is incremented by 1. After incrementing variable i, the data transformation and data unit test process 500 proceeds back to block 504 and the next step in the data transformation process is performed.

In block 512, data unit test instructions i are applied to result of the data transformation process step i. For example, a data unit tester may correspond to the data processor that performed the data transformation process step i, and the instructions of this data unit tester may be executed.

In block 514, a determination is made as to whether any condition specified in the data unit test instructions i failed. For example, the data unit test instructions i may include one or more then instructions that each include one or more conditions. If a condition fails, this may indicate that the corresponding data set is not valid. If some or all of the conditions fail, then the data transformation and data unit test process 500 proceeds to block 516. In some embodiments, failure of a single condition may advantageously cause the entire data unit test to halt, which may result in performance enhancements since additional unit test processing may be avoided. Optionally, if some or all of the conditions fail, then the data transformation and data unit test process 500 also proceeds to block 510 so that the data transformation process can be stopped due to the data set invalidity. Otherwise, if no condition fails, then the data transformation and data unit test process 500 takes no action.

In an embodiment, blocks 506, 508, 510, 512, 514, and/or 516 can be performed asynchronously. Thus, blocks 510, 512, 514, and/or 516 can be performed before, during, or after blocks 506, 508, and/or 510.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
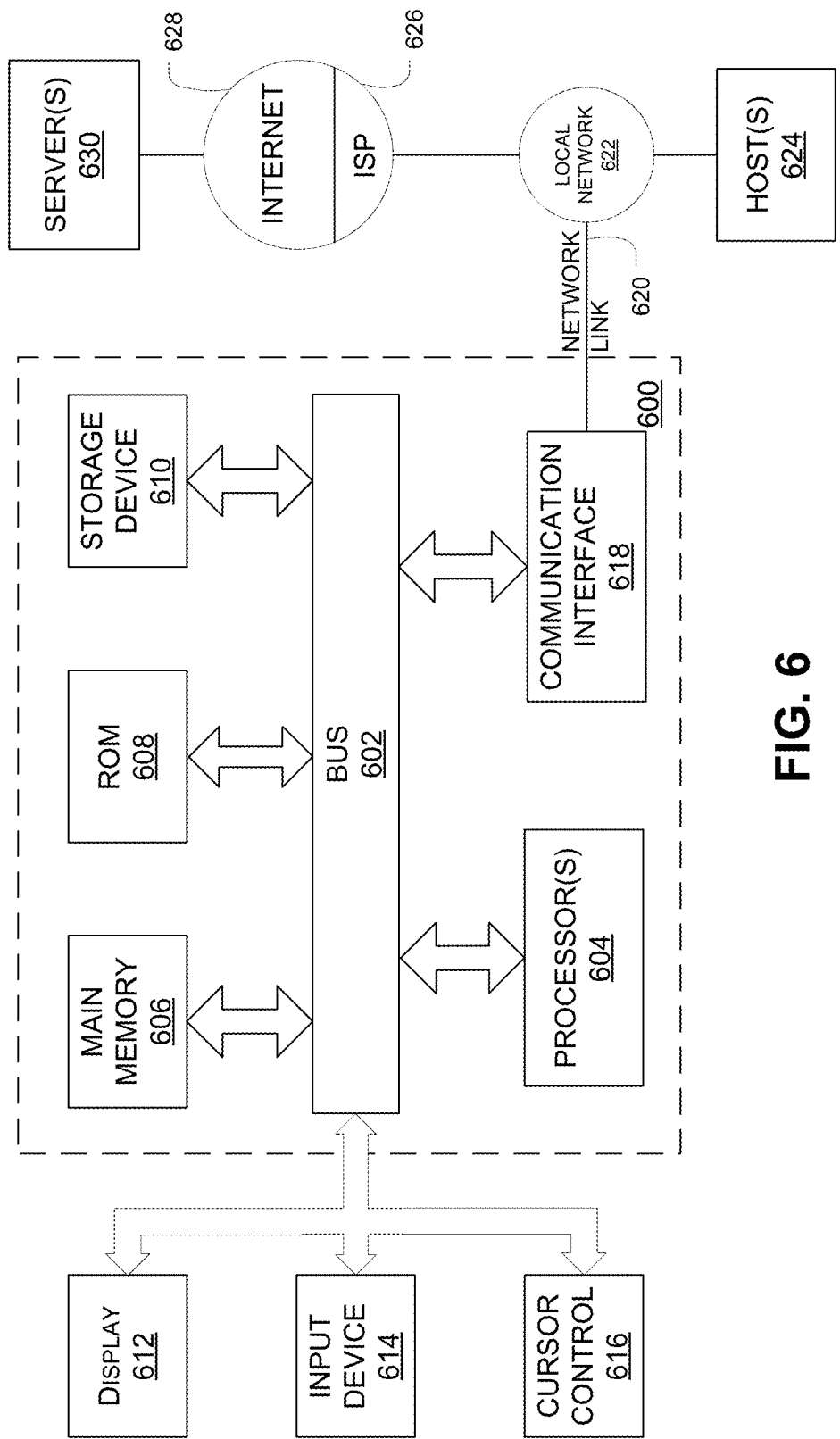
FIG. 6 illustrates a computer system with which certain methods discussed herein may be implemented, according to one embodiment.

For example, FIG. 6 is a block diagram that illustrates a computer system 600 upon which an embodiment may be implemented. For example, any of the computing devices discussed herein may include some or all of the components and/or functionality of the computer system 600.

Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. Main memory 606 may also store cached data, such as zoom levels and maximum and minimum sensor values at each zoom level.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. For example, the storage device 610 may store measurement data obtained from a plurality of sensors.

Computer system 600 may be coupled via bus 602 to a display 612, such as a cathode ray tube (CRT) or LCD display (or touch screen), for displaying information to a computer user. For example, the display 612 can be used to display the user interface 400 described herein with respect to FIG. 4. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieve and execute the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising:
asynchronous from and at least partially concurrent to operation of a first data transformation process performed by one or more data processors and operation of a second data transformation process performed by the one or more data processors, by one or more computer hardware processors separate from the one or more data processors:
loading, by the one or more computer hardware processors, a data set into memory, wherein the data set is generated by the first data transformation process executed by the one or more data processors and forwarded by the first data transformation process to the second data transformation process executed by the one or more data processors;
applying, by the one or more computer hardware processors, a first condition to the data set to obtain a subset of the data set;
executing, by the one or more computer hardware processors, a test function comprising unit test logic on the subset of the data set, wherein the unit test logic includes a matcher; and
determining, by the one or more computer hardware processors, that the subset of the data set is valid in response to execution of the test function on the subset of the data set;
wherein, in response to the determination that the data set is valid, the first and second data transformation processes by the one or more data processors are uninterrupted.

2. The method of claim 1, wherein the first condition corresponds to a first column in the data set.

3. The method of claim 2, further comprising:
determining that a value of a variable of the data set satisfies a second condition; and
determining that the data set is valid in response to a determination that the data set satisfies the first condition and that the value of the variable satisfies the second condition.

4. The method of claim 1, further comprising applying the test function to a second data set prior to execution of the test function on the subset of the data set as a previous step before the first data transformation process.

5. A system comprising:
one or more computer hardware processors;
one or more data processors that are separate from the one or more computer hardware processors; and
a storage device configured to store computer-executable instructions, the computer-executable instructions, when executed by the one or more computer hardware processors, cause the system to at least, asynchronous and at least partially concurrent to operation of a first data transformation process by the one or more data processors and operation of a second data transformation process by the one or more data processors:
load, by the one or more computer hardware processors, a data set into memory, where the data set is generated by the first data transformation process and forwarded by the first data transformation process to the second data transformation process;
apply, by the one or more computer hardware processors, a first condition to the data set to obtain a subset of the data set;
execute, by the one or more computer hardware processors, a test function comprising unit test logic on the subset of the data set, wherein the unit test logic includes a matcher; and
determine, by the one or more computer hardware processors, that the subset of the data set is valid in response to execution of the test function on the subset of the data set;
wherein, in response to the determination that the data set is valid, the first and second data transformation processes by the one or more data processors are uninterrupted.

6. The system of claim 5, wherein a first data processor is configured to perform the first data transformation process.

7. The system of claim 6, wherein a second data processor separate from the first data processor is configured to perform the second data transformation process.

8. The system of claim 5, wherein the first condition corresponds to a first column in the data set.

9. The system of claim 5, wherein the computer-executable instructions, when executed by the one or more computer hardware processors, further cause the system to at least:
determine that a value of a variable of the data set satisfies a second condition; and
determine that the data set is valid in response to a determination that the data set satisfies the first condition and that the value of the variable satisfies the second condition.

10. One or more non-transitory, computer-readable storage media storing computer-executable instructions, which if performed by one or more computer hardware processors that are separate from one or more data processors, cause the one or more computer hardware processors to at least:
asynchronous from and at least partially concurrent to operation of a first data transformation process performed by the one or more data processors and operation of a second data transformation process performed by the one or more data processors,
load, by the one or more computer hardware processors, a data set into memory, wherein the data set is generated by the first data transformation process and forwarded by the first data transformation process to the second data transformation process;
apply, by the one or more computer hardware processors, a first condition to the data set to obtain a subset of the data set;
execute, by the one or more computer hardware processors, a test function comprising unit test logic on the subset of the data set, wherein the unit test logic includes a matcher;
determine, by the one or more computer hardware processors, that the subset of the data set is valid in response to execution of the test function on the subset of the data set;
wherein, in response to the determination that the data set is valid, the first and second data transformation processes by the one or more data processors are uninterrupted.

11. The one or more non-transitory, computer-readable storage media of claim 10, wherein the first condition corresponds to a first column in the data set.

12. The one or more non-transitory, computer-readable storage media of claim 10, wherein the computer-executable instructions, when performed by the one or more computer hardware processors, further cause the one or more computer hardware processors to at least:
- determine that a value of a variable of the data set satisfies a second condition; and
- determine that the data set is valid in response to a determination that the data set satisfies the first condition and that the value of the variable satisfies the second condition.

13. Method comprising:
- asynchronous from and at least partially concurrent to a first data processing operation performed by one or more data processors and a second data processing operation performed by the one or more data processors,
  - by one or more computer hardware processors separate from the one or more data processors,
    - loading, by the one or more computer hardware processors, a data set generated by the first data processing operation executed by the one or more data processors and forwarded by the first data processing operation to the second data processing operation executed by the one or more data processors;
- applying, by the one or more computer hardware processors, a first condition to the data set to obtain a subset of the data set;
- executing, by the one or more computer hardware processors, a test function comprising unit test logic on the subset of the data set, wherein the unit test logic includes a matcher; and
- determining, by the one or more computer hardware processors, that the subset of the data set is valid in response to execution of the test function on the subset of the data set;
- wherein, in response to the determination that the data set is valid, the first and second data processing operations by the one or more data processors are uninterrupted.

* * * * *

UNITED STATES PATENT AND TRADEMARK OFFICE
CERTIFICATE OF CORRECTION

PATENT NO. : 12,032,476 B2
APPLICATION NO. : 17/681639
DATED : July 9, 2024
INVENTOR(S) : Francisco Ferreira et al.

It is certified that error appears in the above-identified patent and that said Letters Patent is hereby corrected as shown below:

In the Specification

In Column 10, Line 39, delete "1226" and insert --122B--.

In Column 10, Line 41, delete "1226." and insert --122B.--.

In Column 10, Line 66, delete "1226" and insert --122B--.

In Column 11, Line 1, delete "1226" and insert --122B--.

In Column 11, Line 2, delete "1226" and insert --122B--.

In Column 11, Line 3, delete "1246" and insert --124B--.

In Column 11, Line 5, delete "1246" and insert --124B--.

In Column 11, Line 6, delete "1226." and insert --122B.--.

In Column 11, Line 7, delete "1246" and insert --124B--.

In Column 11, Line 8, delete "1246" and insert --124B--.

In Column 11, Line 10, delete "1246" and insert --124B--.

In Column 11, Line 12, delete "1246" and insert --124B--.

In Column 11, Line 13, delete "1246" and insert --124B--.

In Column 11, Line 15, delete "1246" and insert --124B--.

Signed and Sealed this
Twenty-fourth Day of September, 2024

Katherine Kelly Vidal
*Director of the United States Patent and Trademark Office*

CERTIFICATE OF CORRECTION (continued)
U.S. Pat. No. 12,032,476 B2

In Column 11, Line 18, delete "1246" and insert --124B--.

In Column 11, Line 20, delete "1246" and insert --124B--.

In Column 11, Line 22, delete "1226" and insert --122B--.

In Column 11, Line 26, delete "1226" and insert --122B--.

In Column 11, Line 31, delete "1226" and insert --122B--.

In Column 11, Line 36, delete "1226" and insert --122B--.

In Column 11, Line 37, delete "1246." and insert --124B.--.

In Column 12, Line 47, delete "tolntersect( )" and insert --toIntersect( )--.